R. W. Carpenter.
Reed Organ.
No. 3,444. Reissued May 18, 1869.
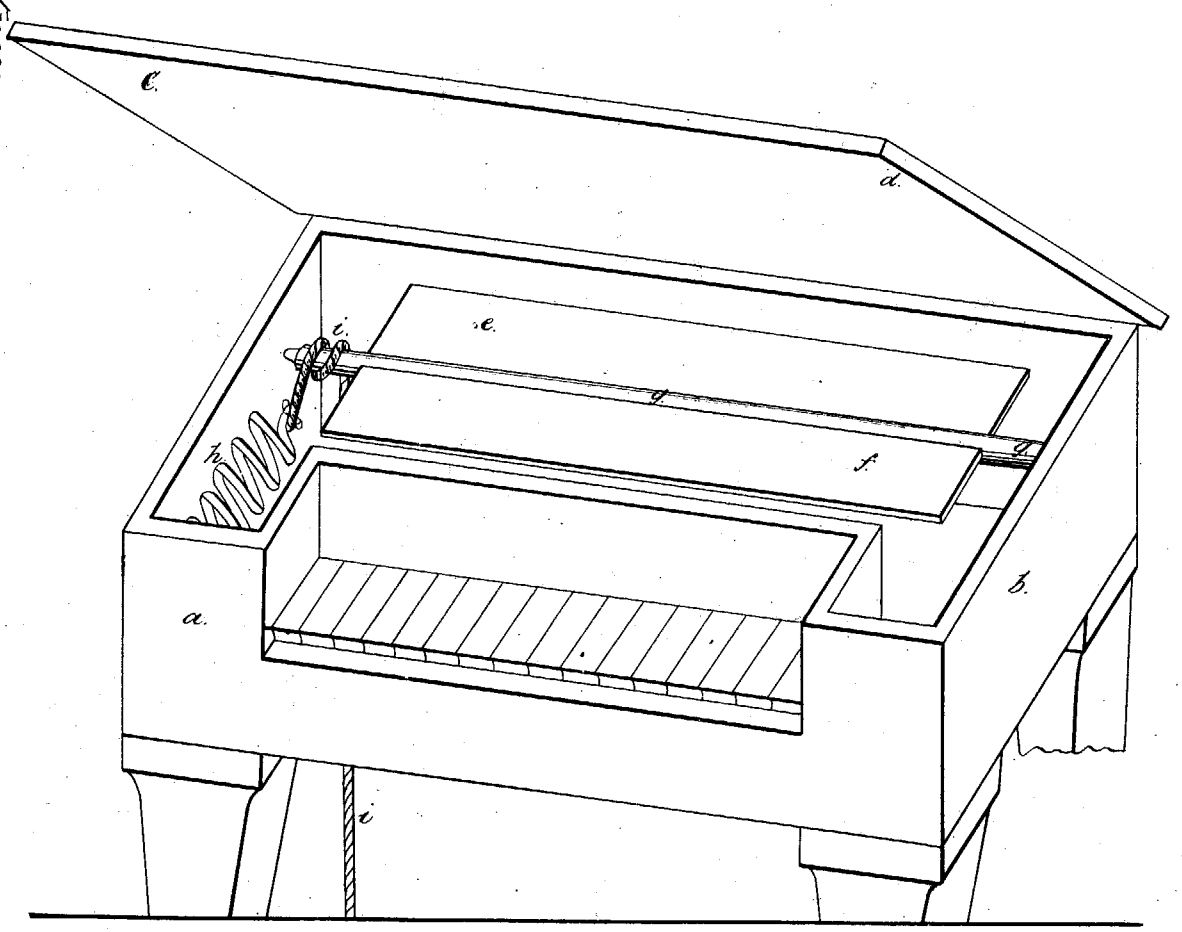
Witnesses.
F. A. Marriner
Wm Humble Hall.
Inventor.
R. W. Carpenter
N. PETERS, PHOTO-LITHOGRAPHER, WASHINGTON, D. C.

UNITED STATES PATENT OFFICE.

ALONZO HITCHCOCK, GEORGE G. SAXE, AND JAMES H. ROBERTSON,
OF NEW YORK, N. Y., ASSIGNEES OF R. W. CARPENTER.

TREMOLO ATTACHMENT.

Specification forming part of Letters Patent No. 48,366, dated June 27, 1865; Reissue No. 3,444, dated May 18, 1869.

*To all whom it may concern:*

Be it known that RILEY W. CARPENTER, of the city, county, and State of New York, did invent a new and useful Improvement in Musical Instruments, called "Tremolo Attachments;" and we do hereby declare the following to be a full and correct description of the same, reference being had to the accompanying drawing, in which—

Figure 1 represents the upper part of the case of an ordinary cabinet-organ with the lid raised to allow the rotation of a pair of vanes or beaters, as hereinafter described.

One of the most attractive ornaments of music, known as the "tremolo," and which is peculiarly effective with the voice, was, before the invention of the present improvement, but imperfectly effected by instrumentation. The nearest approach in instrumental music to this peculiar effect has consisted in the rapid reiteration of a note, instead of the general shake or vibration of the cord; and the best means known of producing it is the mechanism called the "vox humana" stop of the organ, which consists of a valve hung on a spring in the trunk or wind-chest in such manner that the vibration of the spring rapidly closes and opens the passage, and breaks, as it were, the note into a number of parts, instead of conveying it to the ear in a continuous vibratory thrill; but this tremolo, like all devices for the same purpose made prior to this invention, was imperfect. Whether effected by what is called a "butterfly-valve," a balanced valve, or other device acting within the air-passages, the principle of operation is substantially the same, the tremolo being produced at a sacrifice of the fullness, power, and smoothness of the musical note, for it is obvious that during that portion of the action of the valve when the air-passage is most contracted the note must be less smooth, full, and powerful than when the passage is most fully open, and at all times the presence of the valve in the wind chest or passage must act as an obstruction to the volume and roundness of the musical tone. This will be at once perceived by the ear in listening to the tremolo produced by alternately opening and closing an air-passage by means of a valve. The pulsations are sudden, distinct, and harsh, and are more like blows than undulations.

By this invention an entirely new principle is introduced in the production of the tremolo. Instead of setting up a vibration within the air-passages, the tremolo is effected by imparting a common vibration to the air before entering the air-passages, or after it has passed through the pipes, by a mechanism entirely distinct from and exterior to them, and operated at the will of the performer by means which is wholly independent of the air-current produced by the bellows of the instrument.

The principle of this invention therefore consists in imparting a common agitation to the air in which the musical sounds are produced in such a manner as to give rise to a tremolo without checking the flow of the air through the pipe-mouths or reeds, and which shall operate simultaneously upon all the notes of the organ or instrument, said tremolo being produced by an agency external to and independent of the wind-chest or air-passages of the instrument. The mode of imparting vibration to the air may be varied in each particular case, according to the character of the instrument or the preference of the manufacturer, without affecting the principle of the invention, for experiment has demonstrated that, by whatever means the air in contact with that whose vibrations are producing musical tones may be set in agitation, the tremolo will still be produced. When, for example, an air-current is flowing toward or from the reeds or pipe-mouths, an intercepting medium, alternately introduced and withdrawn, however gently, causes a vibrating or pulsating movement of the air, which produces a distinct tremolo, corresponding in the frequency of its pulsations with the alternating movements of the intercepting medium. This effect follows even when the agitation caused by the intercepting action is so slight as to produce a movement of the air which can hardly be made perceptible to the eye. This is proved by the fact that although the intercepting action be confined to one end of the reed-board the tremolo will extend to all the notes of the scale.

The method in which we apply the principle of external agitation to the production of tremolo consists in the introduction of a revolving or swinging fan, vane, or beater into the instrument in such a position that when it is put in motion by a treadle or other suitable means the blows upon the air of the rapidly-moving fan impart to the notes, without impairing their continuity, a tremulousness that is very similar to the tremolo of the voice.

To enable others skilled in the arts to which it appertains to make and use the invention, we will proceed to describe its construction and operation with reference to the drawing, which represents the upper part of the case of an ordinary cabinet-organ, *a b*, with the lid *c d* raised to permit the rotation of the pair of vanes or beaters *e f* placed on the shaft *g*. This shaft is placed at right angles to the keys and in front of the reeds or pipe-mouths, and is caused to revolve by the reciprocal action of the spring *h* and the string *i*, to which it is attached, by making a few turns of the spring around the shaft of the beaters and leading it to a treadle or other suitable means by which it may be worked. In playing passages where the tremolo may be desired a slight motion of the foot causes the reaction of the spring to revolve the shaft, and occasions a succession of blows by the beaters upon the region of the swell, and produces the effect desired.

Having thus described what is believed to be one of the best means of carrying the invention into effect, we wish it to be understood that this invention is not restricted to the details of the manner of application that we have specified, and which we prefer simply because they are the most convenient to adopt, as the revolving beaters may be placed under the cover of the instrument in the space that is usually vacant behind the key-board and swell, and they may be rotated continuously by a double connection with the pedal, or by any other suitable means of operation.

What we claim as the invention, and desire to secure by Letters Patent, is—

1. The application of means to the instrument by which the air may be agitated to produce a tremulous note, substantially as described.

2. The arrangement of an agitator applied to the production of a tremolo outside the trunk, wind-chest, and other air-passages of the instrument, and operated independently of the bellows-power.

3. The arrangement of a fan or agitator in the instrument at right angles to the keys and parallel to the line of reeds or pipe-mouths, at any convenient distance from them, as described.

The above specification of the said invention signed and witnessed at New York this 12th day of April, A. D. 1869.

ALONZO HITCHCOCK.
GEO. G. SAXE.
JAS. H. ROBERTSON.

Witnesses:
N. MARSHMAN,
WM. E. KENDRICK.